United States Patent
Parker et al.

(10) Patent No.: US 11,509,738 B2
(45) Date of Patent: Nov. 22, 2022

(54) SYSTEM FOR MIGRATION OF DATA FROM LEGACY COMPUTER SYSTEM USING WIRELESS PEER-TO-PEER CONNECTION

(71) Applicant: Dell Products L.P., Round Rock, TX (US)

(72) Inventors: Shawn L. Parker, San Francisco, CA (US); Drew J. Nolfo, St. Louis, MO (US); Jefferson W. Raley, Austin, TX (US); Wade Parsons, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 374 days.

(21) Appl. No.: 16/515,643

(22) Filed: Jul. 18, 2019

(65) Prior Publication Data

US 2021/0021686 A1    Jan. 21, 2021

(51) Int. Cl.
*H04L 67/563* (2022.01)
*H04L 9/08* (2006.01)
*H04L 9/40* (2022.01)
*H04W 12/50* (2021.01)
*H04W 12/0471* (2021.01)

(52) U.S. Cl.
CPC .......... *H04L 67/563* (2022.05); *H04L 9/0825* (2013.01); *H04L 63/0853* (2013.01); *H04L 63/0869* (2013.01); *H04W 12/0471* (2021.01); *H04W 12/50* (2021.01)

(58) Field of Classification Search
CPC ............... H04L 67/2814; H04L 9/0825; H04L 63/0853; H04L 9/0869; H04L 2209/80; H04L 9/3226; H04L 63/0869; H04L 67/563; H04W 12/50; H04W 12/0471; H04W 12/00
See application file for complete search history.

(56) References Cited

U.S. PATENT DOCUMENTS

| | | | |
|---|---|---|---|
| 6,067,621 A * | 5/2000 | Yu .................... | H04L 63/0838 713/168 |
| 11,341,223 B1 * | 5/2022 | Eidam ................ | H04L 63/107 |
| 11,436,883 * | 9/2022 | Vega .................. | G06F 7/58 |
| 2003/0033494 A1 * | 2/2003 | Fujibayashi ........ | G06F 3/0647 711/162 |
| 2005/0193180 A1 * | 9/2005 | Fujibayashi ........ | G06F 3/067 711/162 |

(Continued)

*Primary Examiner* — Dhairya A Patel
(74) *Attorney, Agent, or Firm* — Terrile, Cannatti & Chambers; Stephen A. Terrile

(57) ABSTRACT

A method, system and computer-usable medium are disclosed for migrating data from a legacy computer system to a new computer system. Certain aspects include instantiating a wireless portal at a new computer system using a passcode and a randomly generated key, wherein the passcode is generated using the randomly generated key and a private key; displaying the randomly generated key at the new computer system; setting up a wireless peer-to-peer connection between a legacy computer system and the wireless portal by entering the randomly generated key in a second application executed at the legacy computer system; and migrating data from the legacy computer system to the new computer system using the peer-to-peer wireless connection.

17 Claims, 5 Drawing Sheets

(56) References Cited

U.S. PATENT DOCUMENTS

| | | | |
|---|---|---|---|
| 2006/0250982 A1* | 11/2006 | Yuan | H04L 29/12113 370/254 |
| 2007/0101023 A1* | 5/2007 | Chhabra | H04L 69/12 709/246 |
| 2012/0004901 A1* | 1/2012 | Nakano | G06F 40/129 704/E15.02 |
| 2013/0194632 A1* | 8/2013 | Kishimoto | H04N 1/00344 358/1.15 |
| 2016/0150412 A1* | 5/2016 | Liu | G06K 9/18 370/338 |
| 2016/0182624 A1* | 6/2016 | Liang | H04L 67/16 709/228 |
| 2017/0041377 A1* | 2/2017 | Li | H04W 76/14 |
| 2017/0126642 A1* | 5/2017 | Basin | H04L 9/3226 |
| 2018/0234408 A1* | 8/2018 | Bransom | H04L 63/083 |
| 2019/0349758 A1* | 11/2019 | Zhu | H04W 12/50 |
| 2020/0379660 A1* | 12/2020 | Ciudad | G06F 3/0632 |
| 2022/0104017 A1* | 3/2022 | Konda | H04W 12/71 |

* cited by examiner

SYSTEM FOR MIGRATION OF DATA FROM LEGACY COMPUTER SYSTEM USING WIRELESS PEER-TO-PEER CONNECTION

BACKGROUND OF THE INVENTION

Field of the Invention

The present invention relates to interoperation of information handling systems. More specifically, embodiments of the invention relate to a system for migrating data from a legacy computer system using a wireless peer-to-peer connection.

Description of the Related Art

As the value and use of information continues to increase, individuals and businesses seek additional ways to process and store information. Information handling systems, such as computer systems, may be used for these operations. An information handling system, such as a desktop/laptop computer system, generally processes, compiles, stores, and/or communicates information or data for business, personal, or other purposes thereby allowing users to take advantage of the value of the information. Because technology and information handling needs and requirements vary between different users or applications, configurations for different information handling systems may vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use. In addition, information handling systems may include a variety of hardware and software components that may be configured to process, store, and communicate information and may include one or more processors, data storage systems, networking systems, graphics systems, etc.

As processing needs increase or change, users may upgrade their information processing systems to take advantage of updated hardware and software. As an example, laptop computers and/or desktop computers are frequently upgraded with new hardware and/or software. As a further example, legacy laptop computers and/or legacy desktop computers may be replaced with new/upgraded laptop computers and/or desktop computers.

SUMMARY OF THE INVENTION

A system of one or more computers can be configured to perform particular operations or actions by virtue of having software, firmware, hardware, or a combination of them installed on the system that in operation causes or cause the system to perform the actions for wirelessly migrating data between computer systems. One general aspect includes a computer-implemented method for wireless peer-to-peer data migration including: instantiating a wireless portal at a new computer system using a passcode and a randomly generated key, where the passcode is generated using the randomly generated key and a private key, where the wireless portal is instantiated using a first application executed at the new computer system; displaying the randomly generated key at the new computer system; setting up a wireless peer-to-peer connection between a legacy computer system and the wireless portal by entering the randomly generated key in a second application executed at the legacy computer system, where second application generates a matching passcode using the randomly generated key entered in the second application and the private key, where the wireless peer-to-peer connection is established using the randomly generated key and matching passcode; and migrating data from the legacy computer system to the new computer system using the peer-to-peer wireless connection. Other embodiments of this aspect include corresponding computer systems, apparatus, and computer programs recorded on one or more computer storage devices, each configured to perform the actions of the methods.

Another general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: instantiating a wireless portal at a new computer system using a randomly generated key and a passcode, where the passcode is generated using the randomly generated key and a private key, where the wireless portal is instantiated using a first application executed at the new computer system; displaying the randomly generated key at the new computer system; setting up a wireless peer-to-peer connection between a legacy computer system and the wireless portal by entering the randomly generated key in a second application executed at the legacy computer system, where second application generates a matching passcode using the randomly generated key entered in the second application and the private key, where the wireless peer-to-peer connection is established using the randomly generated key and matching passcode; and migrating data from the legacy computer system to the new computer system using the wireless peer-to-peer connection.

Another general aspect includes a non-transitory, computer-readable storage medium embodying computer program code, the computer program code including computer executable instructions configured for: instantiating a wireless portal at a new computer system using a randomly generated key and a passcode, where the passcode is generated using the randomly generated key and a private key, where the wireless portal is instantiated using a first application executed at the new computer system; displaying the randomly generated key at the new computer system; setting up a wireless peer-to-peer connection between a legacy computer system and the wireless portal by entering the randomly generated key in a second application executed at the legacy computer system, where second application generates a matching passcode using the randomly generated key entered in the second application and the private key, where the wireless peer-to-peer connection is established using the randomly generated key and matching passcode; and migrating data from the legacy computer system to the new computer system using the wireless peer-to-peer connection.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
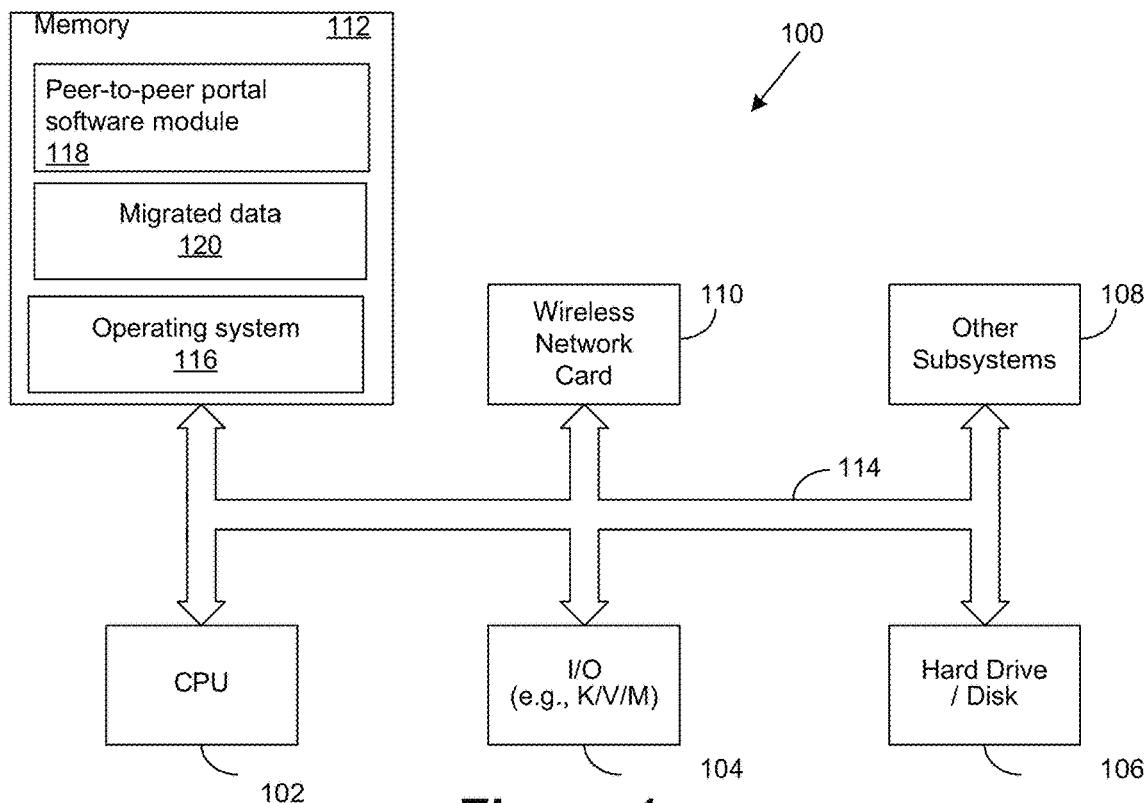
FIG. 1 is a generalized illustration of an information handling system that is configured as a computer system to which data is to be migrated in accordance with certain embodiments.

A system, method, and computer-readable medium are disclosed for migrating data from a legacy computer system to a further computer system using a peer-to-peer wireless connection. As used herein, a "legacy computer system" includes any computer system from which data and/or configuration settings are migrated to another computer system. As used herein, "another computer system" includes any computer system to which data and/or configuration settings are migrated from the legacy computer system.

In certain embodiments, the computer system to which the data and/or configuration settings are migrated is typically an upgraded computer system. That is, a computer system having greater and/or different processing capabilities than the legacy computer system. As an example, the upgraded computer system may be a laptop computer having faster processor(s), faster/more memory storage, capabilities of running newer/different operating systems, etc., compared to a legacy laptop computer. For purposes of the following discussion, the computer system to which the data and/or configuration settings are transferred will be referenced as a "new" computer system, in that it is a new recipient of the migrated data and/or configuration settings (collectively "data"). Also, for purposes of the following discussion, the legacy computer system and new computer system will be described in the context of migrating data between a legacy laptop computer and a new laptop computer.

Certain embodiments recognize that it is more efficient to automatically migrate data and/or configuration settings from a legacy laptop system than to manually configure a new laptop system with the same data and/or configuration settings for deployment. Automatic migration of data may take place over a wired connection that employs an onboard Network Interface Cards (NICs) on both laptops. Automatic migration of data may also take place using peripheral NICs, such as USB network dongles, etc. However, onboard NICs, cables, dongles, etc. are not always readily available when needed for data migration. Certain embodiments recognize that this lack of availability can be costly and lead to delays when deploying new laptops. Certain embodiments recognize that this may impact the efficiency of onsite technicians on projects where the technicians need to transfer data from an old laptop system to a new laptop system. This can also lead to increased deployment costs as well as customer dissatisfaction.

Certain embodiments appreciate that many new laptops are currently manufactured without onboard NICs. However, certain embodiments recognize that new laptops are all typically manufactured with wireless NICs. Likewise, certain embodiments recognize that legacy laptops typically include a wireless NICs. As such, certain embodiments of the disclosed system are configured to employ a wireless peer-to-peer constant connection between two laptops. Certain embodiments recognize that such a wireless peer-to-peer connection is capable of transferring data from the legacy laptop to the new laptop, even in those instances in which the new laptop does not include an onboard NIC. Certain embodiments recognize that a wireless peer-to-peer connection can be particularly useful when a significant amount of data is to be transferred. Certain embodiments recognize that a wireless peer-to-peer connection is preferable to transfers of significant amounts of data using Bluetooth or Wi-Fi Direct technology.

Certain embodiments of the disclosed system may be implemented in one or more information handling systems used, for example, by a product supplier and/or product retailer. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a laptop computer, a desktop computer, or any other computing device suitable device for processing information. he information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
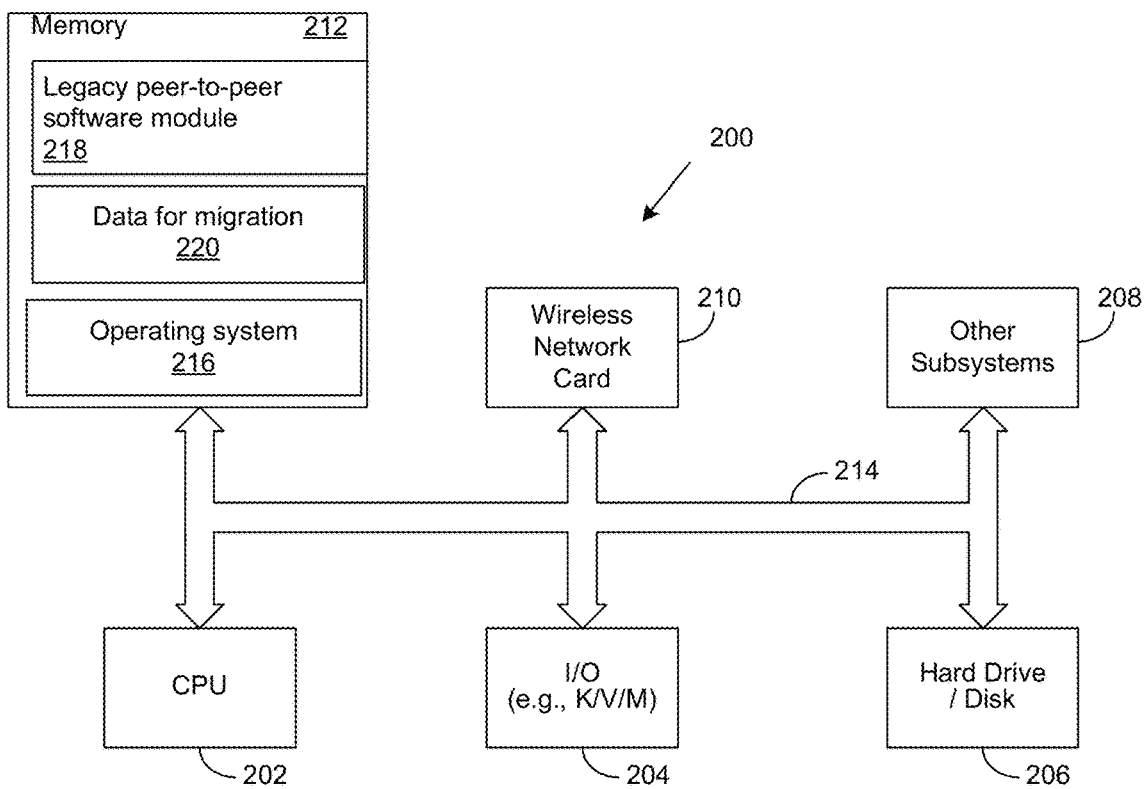
FIG. 2 is a generalized illustration of an information handling system that is configured as a legacy computer system from which data is to be migrated in accordance with certain embodiments.

FIG. 1 and FIG. 2 are a generalized illustrations of information handling systems, such as a new laptop system 100 and legacy laptop system 200, that can be used to implement the system and method set forth in the present disclosure. In the example shown in FIG. 1, the information handling system is configured as the new laptop system 100 that is configured to receive data that is migrated from the legacy laptop system 200. The new laptop system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the new laptop system 100 also includes wireless network card 110 operable to establish and connect to a legacy laptop system. As noted herein, many new laptop systems include such a wireless network card 110 while excluding an onboard wired network card. However, the disclosed system is suitable for use with any laptop system provided with a wireless network card whether or not the laptop system has an onboard NIC.

The new laptop system 100 also includes system memory 112, which is interconnected to the foregoing via one or more buses 114. System memory 112 further comprises operating system (OS) 116 and in various embodiments may also comprise a peer-to-peer portal software module 118 having a plurality of software engines that may be executed as part of an application at the new laptop system 100, as described herein. In certain embodiments, memory 112 may also include migrated data storage 120 for storing data migrated from the legacy laptop system 200 for commitment on the new laptop system 100.

FIG. 2 depicts a generalized illustration of the legacy laptop system 200 that can be used to implement the system and method set forth in the present disclosure. In the example shown in FIG. 2, the legacy laptop system that is configured to receive data that is migrated from the legacy laptop system 200. The legacy laptop system 200 includes a processor (e.g., central processor unit or "CPU") 202, input/output (I/O) devices 204, such as a display, a keyboard, a mouse, and associated controllers, a hard drive or disk storage 206, and various other subsystems 208. In various embodiments, the legacy laptop system 200 also includes a wireless network card 210 operable to establish and connect to the new laptop system 100.

The legacy laptop system 200 also includes system memory 212, which is interconnected to the foregoing via one or more buses 214. System memory 212 further comprises operating system (OS) 216 and in various embodiments may also comprise a legacy peer-to-peer software module 218 having a plurality of software engines that may be executed as part of an application at the legacy laptop system 200, as described herein. In certain embodiments, memory 212 may also include migrated data storage 220 for storing data that is to be migrated from the legacy laptop system 200 for commitment on the new laptop system 100.

Figure 3:
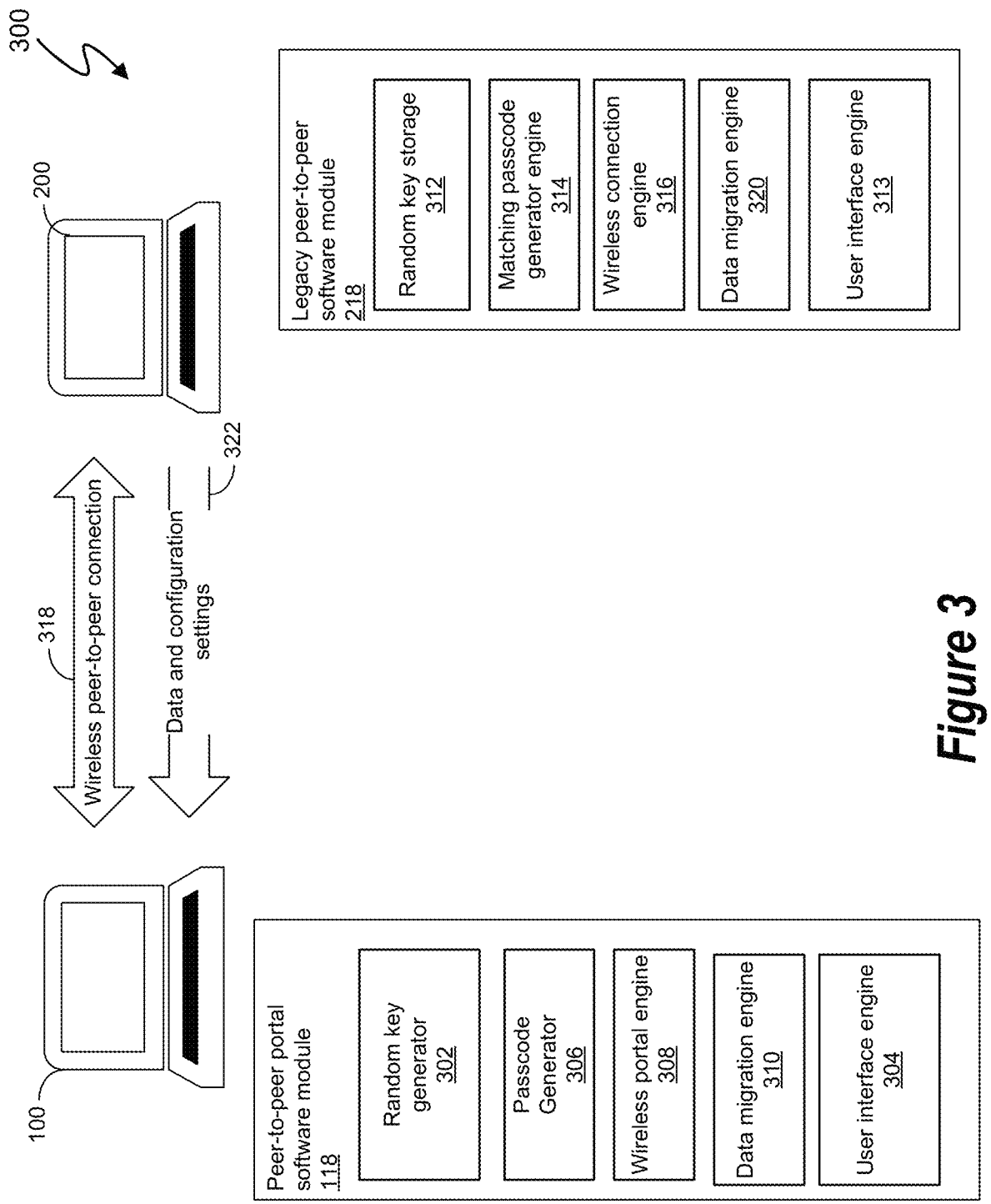
FIG. 3 depicts an exemplary electronic environment and software engines that may be used in the peer-to-peer portal software module and legacy peer-to-peer software module in certain embodiments.

FIG. 3 depicts exemplary electronic environment 300 and software engines that may be used in the peer-to-peer portal software module 118 and legacy peer-to-peer software module 218 in certain embodiments of the disclosed system. In certain embodiments, the peer-to-peer portal software module 118 is operable to configure the new laptop system 100 with a wireless portal having a SSID and passcode. In certain embodiments, the peer-to-peer portal software module 118 includes a random key generator 302 that is configured to generate a random key. In certain embodiments, the random key is used as the SSID and is displayed at a display of the new laptop system by a user interface engine 304.

The random key may be generated in a variety of different manners. In one example, certain embodiments may generate the random key using alphanumeric characters. In certain embodiments, four random characters may be employed. In certain embodiments, vowels may be excluded from the pool of available alphanumeric characters to prevent the random key from containing undesired words. In some examples, the four character unique alphanumeric key without vowels may provide as many as 194,481 unique keys.

Certain embodiments of the peer-to-peer portal software module 118 include a passcode generator 306. In certain embodiments, the passcode generator 306 provides a passcode derived from encryption of the random key using a private key. In certain embodiments, the private key is shared by both legacy laptop system 200 and new laptop system 100 through a set known value in the executable code used to implement the applications running on the legacy laptop system 200 and new laptop system number 100. A passcode is created by using an algorithm that takes this set known value and the SSID of the new laptop system number 100 to dynamically create the passcode. Certain embodiments include a wireless portal engine 308 configured to set up a Wi-Fi connection portal at the new laptop system 100. In certain embodiments, the Wi-Fi portal is configured and enabled with the random key as the SSID and the passcode as the portal password.

As noted above, the random key generated at the new laptop system 100 is shown at the display of the new laptop system 100. In certain embodiments, a user enters the random key into the legacy laptop system 200 through user interface engine 313 for storage in the random key storage 312. In certain embodiments, a matching passcode is generated by a matching passcode generator engine 314 using the random key and the same private key used to encrypt the passcode at the new laptop system 100.

Certain embodiments of the legacy peer-to-peer software module include a wireless connection engine 316. In certain embodiments, the wireless connection engine 316 generates a Wi-Fi profile configuration using the random key and passcode. In certain embodiments, the Wi-Fi profile configuration is used to establish a peer-to-peer connection with the new laptop system 100, as depicted at arrow 318. Once the wireless peer-to-peer connection 318 has been established, the data migration engine 320 cooperates with data migration engine 310 to transfer data from the legacy laptop system 200 to the new laptop system 100, as depicted at arrow 322.

Figure 4:
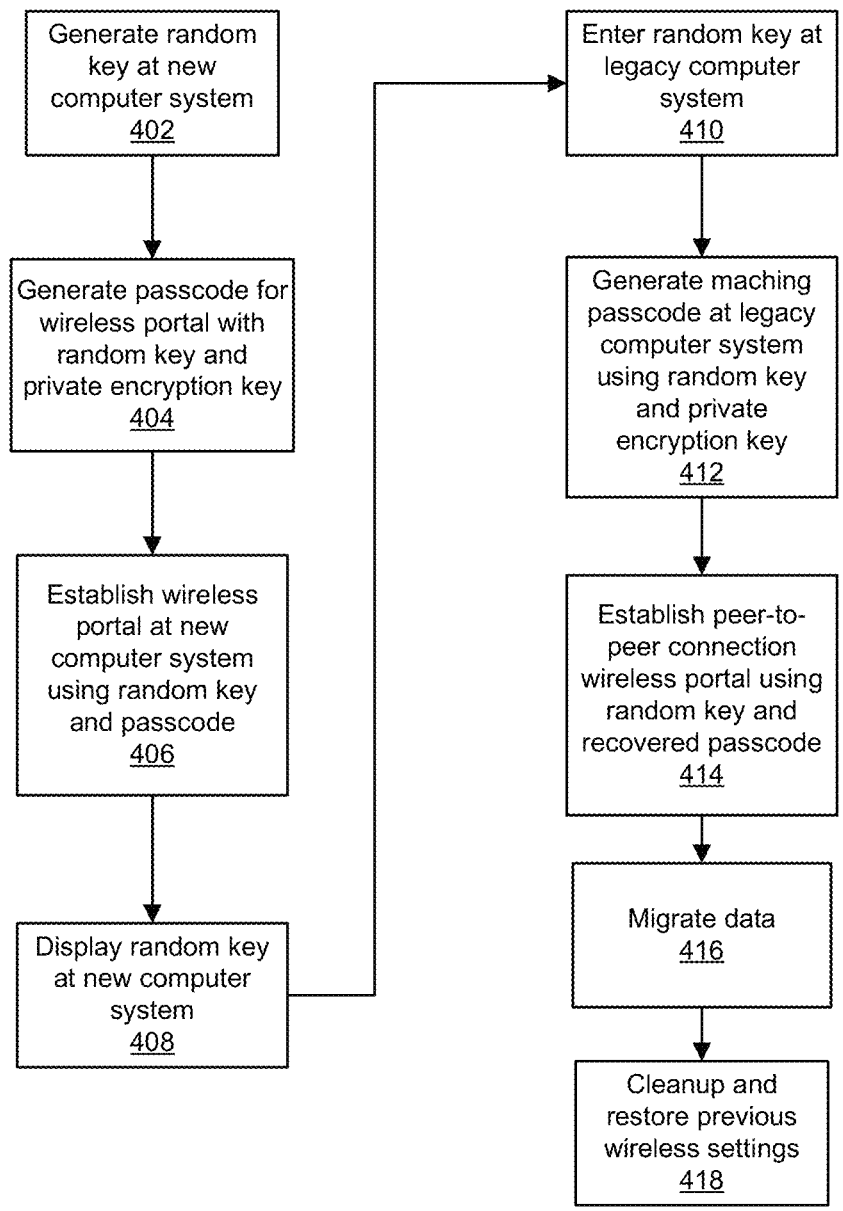
FIG. 4 is a flowchart depicting exemplary operations that may be executed by the disclosed system.

FIG. 4 is a flowchart depicting exemplary operations that may be executed by the disclosed system. In this specific example, a random key is generated at a first computer system, such as new laptop system 100, at operation 402. At operation 404, the new computer system generates a passcode for the wireless portal using the random key and a private encryption key. At operation 406, a wireless portal at the new computer system is established using the random key and passcode. Certain embodiments then display the random key to a user at operation 408. In this example, the random key is entered by the user at the legacy computer system, which generates a matching using the random key and private encryption key at operation 412. At operation 414, certain embodiments establish a peer-to-peer connection between the new laptop system and legacy laptop system using the random key and passcode. Data is migrated from the legacy laptop system to the new laptop system at operation 416. Upon completion of the data migration, the legacy computer system and new computer system may execute cleanup and/or restore operations to place each system in a proper operative state. In one example, the legacy laptop system deletes the peer-to-peer Wi-Fi profile of the new laptop system and deletes any information relating to the profile. In another example, the new laptop system may take down and delete the Wi-Fi portal and any information associated with it to prevent misuse. Additionally, certain embodiments of the new laptop system restore prior Wi-Fi hotspot profiles to a state that existed prior to the migration of the data from the legacy laptop system.

Figure 5:
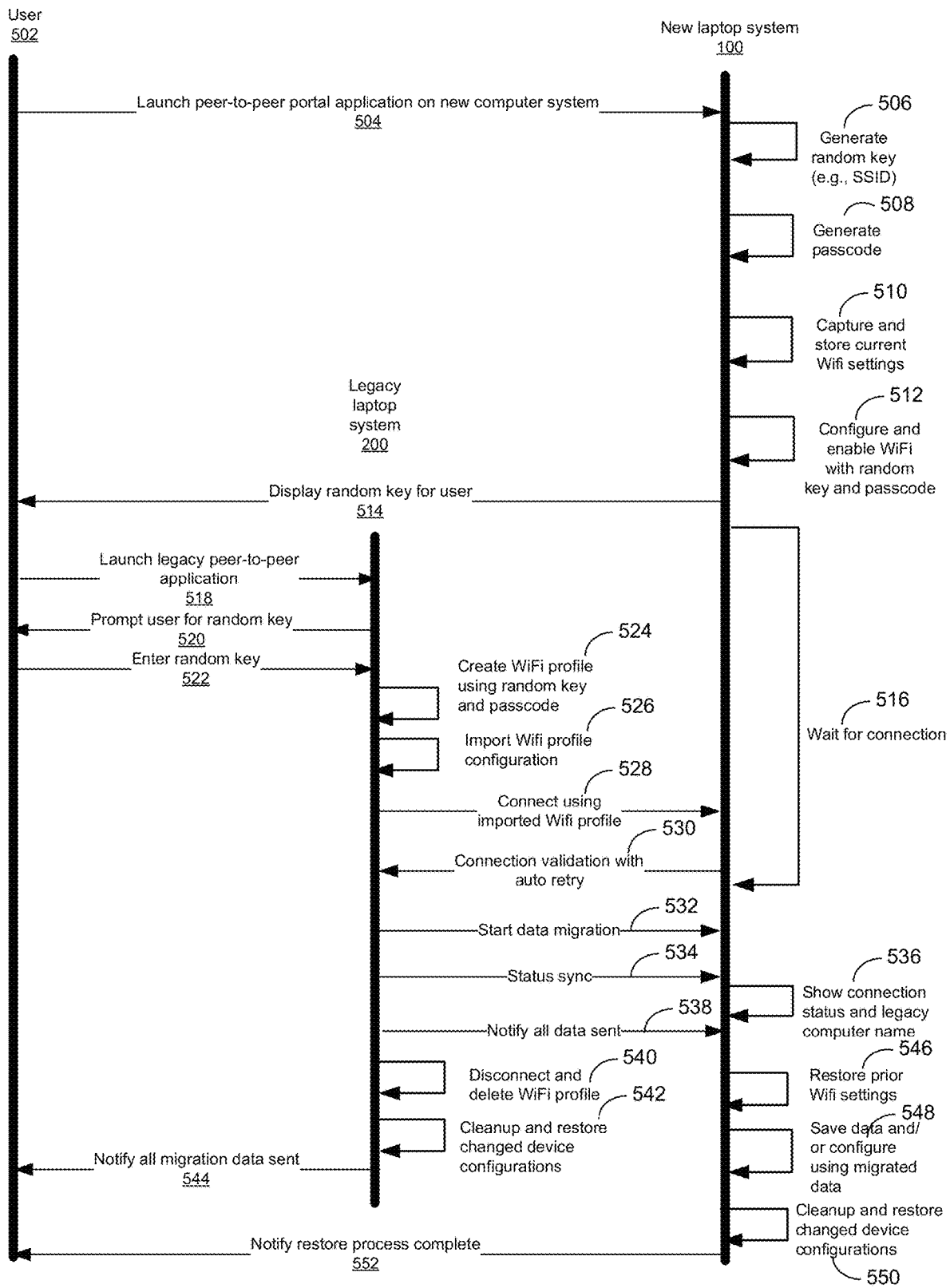
FIG. 5 depicts an exemplary flow of operations that may be executed by a user, a legacy laptop system, and new laptop system in accordance with certain embodiments of the disclosed system.

FIG. 5 depicts an exemplary flow of operations that may be executed by a user 502, legacy laptop system 200, and new laptop system 100 in accordance with certain embodiments of the disclosed system. In this example, user 502 launches a peer-to-peer application on the new laptop system 100. In certain embodiments, the new laptop system 100 generates a random key at operation 406 and uses that random key, along with a private encryption key, to generate a passcode at operation 508. Certain embodiments capture and store existing Wi-Fi settings at operation 510. At operation 512, a Wi-Fi portal is configured using the random key and passcode. In certain embodiments, the random key is used as the SSID and the passcode as the password associated with the SSID. Certain embodiments display the random key to the user at operation 514 and the new laptop system 100 waits for a connection at operation 516.

At operation 518, the user 502 launches the legacy peer-to-peer application at the legacy laptop system 200. Once the legacy peer-to-peer application is launched, the application prompts the user 502 for entry of the random key at operation 520. The user 502 responds to the prompt by entering the random key into the legacy peer-to-peer application at operation 522.

Using the random key, the peer-to-peer application generates a matching passcode from the random key using the same private key used by the new laptop system 100 to originally generate the passcode for the Wi-Fi portal. At operation 524, the legacy peer-to-peer application at the legacy laptop system 200 creates a Wi-Fi profile using the random key and passcode and imports the Wi-Fi profile configuration into the Wi-Fi system of the legacy laptop system 200.

At operation 528, the legacy laptop system 200 communicates with the new laptop system to connect the new laptop system 100 with the legacy laptop system 200 in a peer-to-peer wireless connection. In certain embodiments, the legacy laptop system 200 confirms the validity of the IP address assigned to the legacy laptop system 200 at operation 530. If the IP address is invalid, the legacy laptop system 200 automatically continues its attempts to connect with the new laptop system 100. In certain embodiments, the legacy laptop system 200 executes a predetermined number of connection attempts before notifying the user that the legacy laptop system 200 is unable to connect with the new laptop system 100.

Once the peer-to-peer connection is established, certain embodiments begin data migration from the legacy laptop system 200 to the new laptop system 100 at operation 532. In certain embodiments, once the peer-to-peer connection is established, the new legacy laptop system 200 provides a status synchronization message to the new laptop system 100 at operation 534. In certain embodiments, the status synchronization message is provided to inform the user at the new laptop system number 100 of the current status of the migration process. At operation 536, the new laptop system 100 may change the information that it displays to the user 502. In certain embodiments, the random key is removed from the display for security purposes. Additionally, on the alternative, the new laptop system 100 may display the connection status and/or the name assigned to the legacy laptop system 200 in, for example, the system identification data of the legacy laptop system 200. Displaying the name of the legacy laptop system 200 allows the user 502 to have confidence that data is being migrated from the correct computer system.

Once the legacy laptop system 200 completes transmission of all the data that is to be migrated, it sends a confirmation to the new laptop system 100 of this fact at operation 538. In certain embodiments, the legacy system disconnects from the wireless peer-to-peer connection and deletes the corresponding Wi-Fi profile at operation 540. At operation 542, the legacy laptop system cleans-up temporary files, etc., generated by the legacy peer-to-peer application and restores the legacy laptop system to its original state. Upon completion of operation 542, certain embodiments of the legacy laptop system 200 may provide a notification to the user (e.g., a message at its display) that the legacy laptop system 100 has completed migrating the data to the new laptop system 100.

At the new laptop system 100, the peer-to-peer portal application may respond to the notification provided at operation 538 by deleting the peer-to-peer Wi-Fi connection and restoring the Wi-Fi settings that were captured and stored at operation 510. Certain embodiments save the migrated data at the new laptop system 100 and/or configure the new laptop system 100 using the migrated data. At operation 550, certain embodiments clean up and restore changed device configuration settings that resulted from the data migration process and notify the user 502 at operation 552 that the configuration and restore process is complete.

It will be recognized, in view of the teachings of the present disclosure, that variations on the sequence and organization of the operations shown in FIG. 4 and FIG. 5 may be made without departing from the basic operation of the overall system. Further, it will be recognized, in view of the present disclosure, that the peer-to-peer portal software application and legacy peer-to-peer software application may be provided as a single application package. In certain embodiments, the single application package may be installed on both the new laptop system 100 and legacy laptop system 200. However, the user may select whether the installed software package is to execute the peer-to-peer portal software application or legacy peer-to-peer software application at runtime. Consequently, although the portal peer-to-peer software application and legacy peer-to-peer software application are referenced as two separate applications, the applications may be combined as a single software package that may be installed on both the new laptop system 100 and legacy laptop system 200, where the option as to which of the applications is to be executed at the system is determined by the user.

Figure 6:
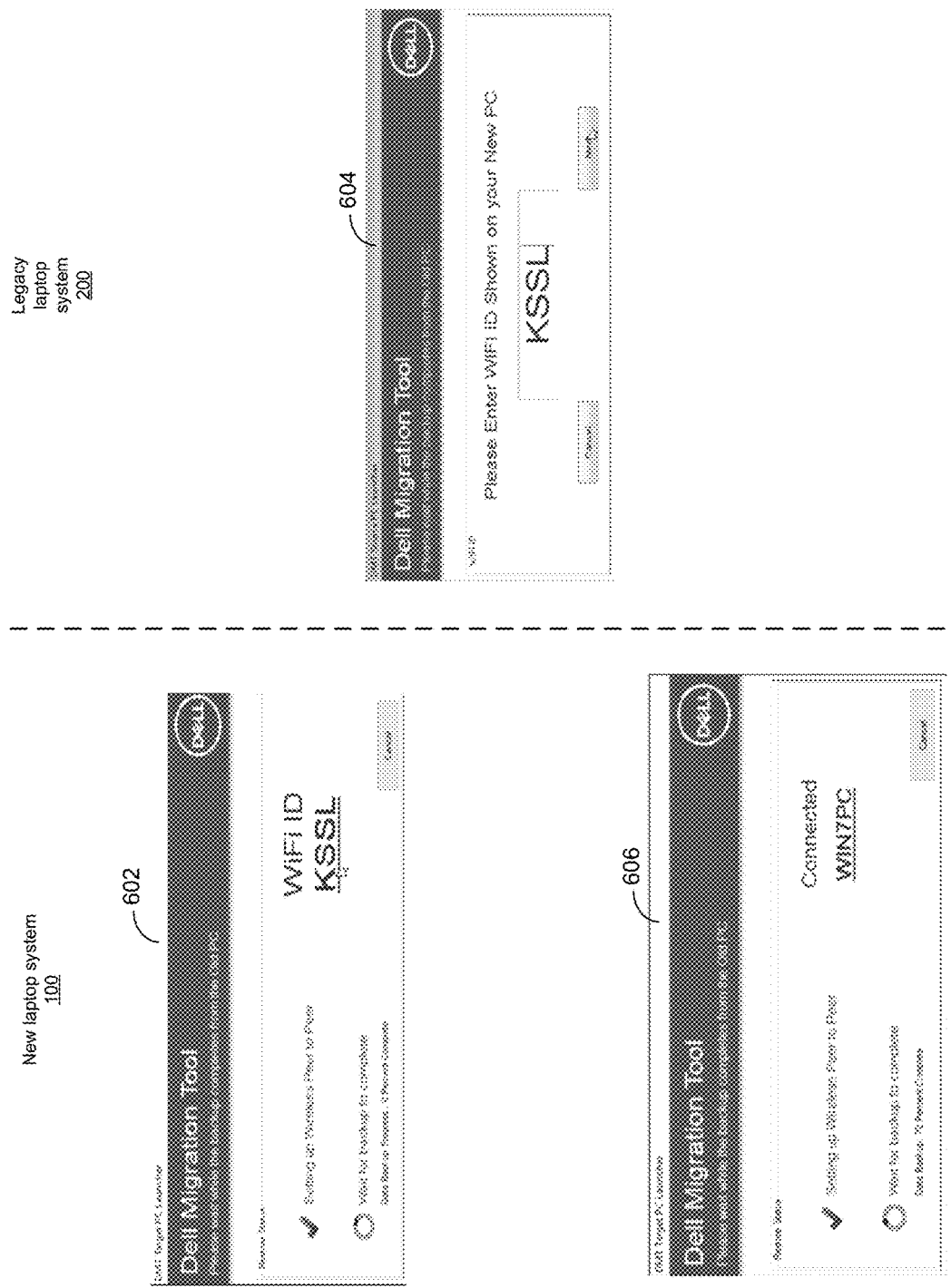
FIG. 6 depicts exemplary screen shots that may be displayed at the new laptop system and legacy laptop system during various portions of the data migration process.

FIG. 6 depicts exemplary screen shots that may be displayed at the new laptop system 100 and legacy laptop system 200 during various portions of the data migration process. In this example, screen shot 602 depicts one manner in which the randomly generated SSID (e.g., random key) is display to the user in certain embodiments. Here, the SSID is a for character alphabetic identifier without vowels (e.g., KSSL). Screen shot 604 depicts how certain embodiments may prompt the user to enter the SSID twenty shown on screen shot 602 for use in create a corresponding Wi-Fi peer-to-peer connection at the legacy laptop system 200. Once the wireless peer-to-peer connection is established, certain embodiments remove the SSID from the display at the new laptop system 100. In certain embodiments, the display changes to show the status of the connection (e.g., "connected") and/or the name of the legacy laptop system 200 (e.g., "WIN7PC").

As will be appreciated by one skilled in the art, the system disclosed herein may be embodied as a method, system, or computer program product. Accordingly, embodiments of the disclosed system may be implemented in hardware, in software (including firmware, resident software, microcode, etc.) or in an embodiment combining software and hardware. Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object oriented programming language such as Java, Smalltalk, C++ or the like. However, the computer program code for carrying out operations of the disclosed system may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments of the disclosed system, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention. Consequently, the invention is intended to be limited only by the spirit and scope of the appended claims, giving full cognizance to equivalents in all respects.

What is claimed is:

1. A computer-implemented method for wireless peer-to-peer data migration comprising:
   instantiating a wireless portal at a new computer system using a passcode and a randomly generated key, wherein the passcode is generated using the randomly generated key and a private key, wherein the wireless portal is instantiated using a first application executed at the new computer system, the instantiating including capturing current WiFi settings of the new computer system;
   displaying the randomly generated key at the new computer system;
   setting up a wireless peer-to-peer connection between a legacy computer system and the wireless portal of the new computer system by entering the randomly generated key in a second application executed at the legacy computer system, the wireless peer-to-peer connection comprising a WiFi connection, wherein second application generates a matching passcode using the randomly generated key entered in the second application and the private key, the setting up the wireless peer-to-peer connection including creating a WiFi profile for the legacy computer system using the matching passcode and the randomly generated key, wherein the wireless peer-to-peer connection is established using the randomly generated key and matching passcode;
   migrating data from the legacy computer system to the new computer system using the peer-to-peer wireless connection;
   validating, with the second application, that an IP address assigned to the legacy computer system is a valid IP address; and
   executing a predetermined number of retry attempts to establish the wireless peer-to-peer connection with the new computer system until a valid IP address is obtained as determined at the second application.

2. The computer-implemented method of claim 1, wherein:
   the randomly generated key is used as a SSID for the wireless peer-to-peer connection, and the passcode is used as a password for the peer-to-peer wireless connection.

3. The computer-implemented method of claim 1, wherein the randomly generated key is an alphanumeric key without vowels.

4. The computer-implemented method of claim 1, further comprising:
   removing display of the randomly generated key at the new computer system once the wireless peer-to-peer connection between the new computer system and the legacy computer system has been established.

5. The computer-implement method of claim 4, wherein:
   the legacy computer system has an assigned computer name, and wherein the assigned computer name is displayed at the new computer system when the wireless peer-to-peer connection between the new computer system and the legacy computer system has been established.

6. The computer-implemented method of claim 1, wherein:
the new computer system lacks an on-board physical network interconnection card.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
instantiating a wireless portal at a new computer system using a randomly generated key and a passcode, wherein the passcode is generated using the randomly generated key and a private key, wherein the wireless portal is instantiated using a first application executed at the new computer system, the instantiating including capturing current WiFi settings of the new computer system;
displaying the randomly generated key at the new computer system;
setting up a wireless peer-to-peer connection between a legacy computer system and the wireless portal of the new computer system by entering the randomly generated key in a second application executed at the legacy computer system, the wireless peer-to-peer connection comprising a WiFi connection, wherein second application generates a matching passcode using the randomly generated key entered in the second application and the private key, the setting up the wireless peer-to-peer connection including creating a WiFi profile for the legacy computer system using the matching passcode and the randomly generated key, wherein the wireless peer-to-peer connection is established using the randomly generated key and matching passcode;
migrating data from the legacy computer system to the new computer system using the wireless peer-to-peer connection;
validating, with the second application, that an IP address assigned to the legacy computer system is a valid IP address; and
executing a predetermined number of retry attempts to establish the wireless peer-to-peer connection with the new computer system until a valid IP address is obtained as determined at the second application.

8. The system of claim 7, wherein:
the randomly generated key is used as a SSID for the wireless peer-to-peer connection, and the passcode is used as a password for the wireless peer-to-peer connection.

9. The system of claim 7, wherein the instructions are further configured for: generating the randomly generated key as an alphanumeric key without vowels.

10. The system of claim 7, wherein the instructions are further configured for:
removing display of the randomly generated key at the new computer system once the wireless peer-to-peer connection between the new computer system and the legacy computer system has been established.

11. The system of claim 10, wherein the legacy computer system has an assigned computer name, and wherein the instructions are further configured for:

displaying the assigned computer name at the new computer system when the wireless peer-to-peer connection between the new computer system and the legacy computer system has been established.

12. The system of claim 7, wherein:
the new computer system lacks an on-board physical network interconnection card.

13. A non-transitory, computer-readable storage medium embodying computer program code, the computer program code comprising computer executable instructions configured for:
instantiating a wireless portal at a new computer system using a randomly generated key and a passcode, wherein the passcode is generated using the randomly generated key and a private key, wherein the wireless portal is instantiated using a first application executed at the new computer system, the instantiating including capturing current WiFi settings of the new computer system;
displaying the randomly generated key at the new computer system;
setting up a wireless peer-to-peer connection between a legacy computer system and the wireless portal of the new computer system by entering the randomly generated key in a second application executed at the legacy computer system, the wireless peer-to-peer connection comprising a WiFi connection, wherein second application generates a matching passcode using the randomly generated key entered in the second application and the private key, the setting up the wireless peer-to-peer connection including creating a WiFi profile for the legacy computer system using the matching passcode and the randomly generated key, wherein the wireless peer-to-peer connection is established using the randomly generated key and matching passcode;
migrating data from the legacy computer system to the new computer system using the wireless peer-to-peer connection;
validating, with the second application, that an IP address assigned to the legacy computer system is a valid IP address; and
executing a predetermined number of retry attempts to establish the wireless peer-to-peer connection with the new computer system until a valid IP address is obtained as determined at the second application.

14. The non-transitory, computer-readable storage medium of claim 13, wherein
the randomly generated key is used as a SSID for the wireless peer-to-peer connection, and the passcode is used as a password for the wireless peer-to-peer connection.

15. The non-transitory, computer-readable storage medium of claim 13, wherein the instructions are further configured for:
generating the randomly generated key as an alphanumeric key without vowels.

16. The non-transitory, computer-readable storage medium of claim 13, wherein the instructions are further configured for:
removing display of the randomly generated key at the new computer system once the wireless peer-to-peer connection between the new computer system and the legacy computer system has been established.

17. The non-transitory, computer-readable storage medium of claim 16, wherein the legacy computer system has an assigned computer name, and wherein the instructions are further configured for:

displaying the assigned computer name at the new computer system when the wireless peer-to-peer connection between the new computer system and the legacy computer system has been established.

* * * * *